Patented June 24, 1941

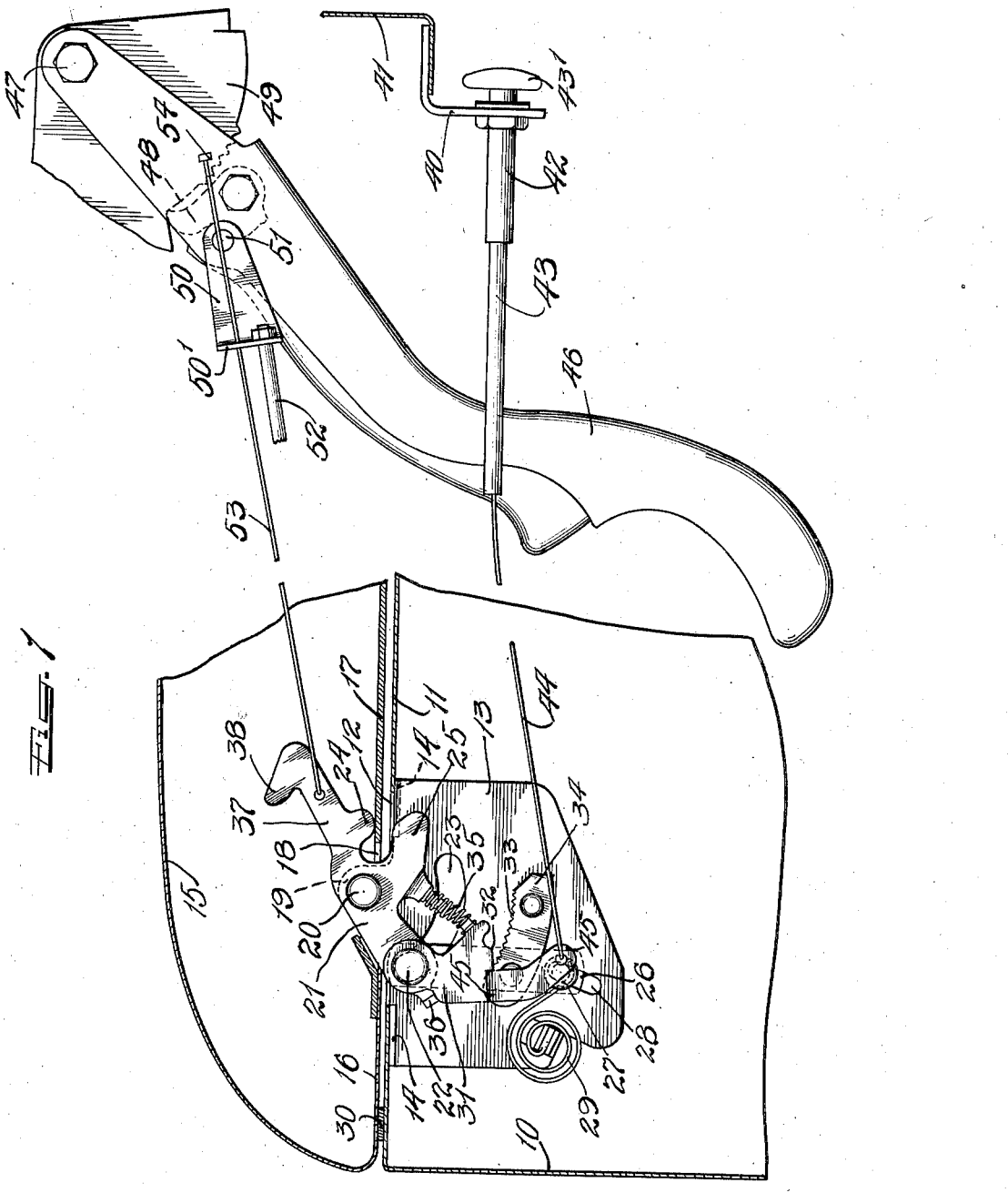

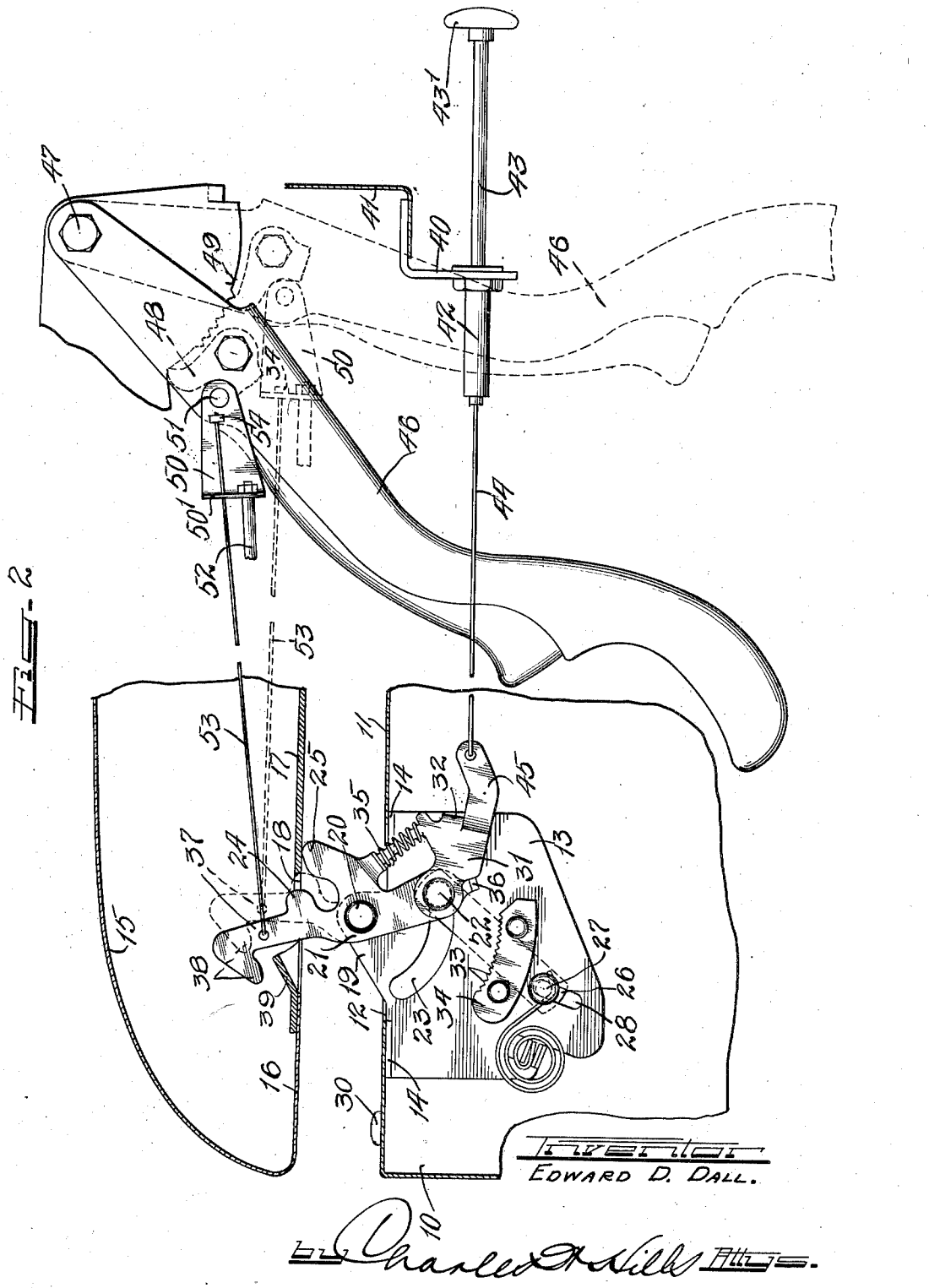

2,246,791

UNITED STATES PATENT OFFICE 2,246,791

AUTOMOBILE HOOD LATCHING MECHANISM

Edward D. Dall, Detroit, Mich., assignor to Houdaille-Hershey Corporation, Detroit, Mich., a corporation of Michigan Application August 17, 1940, Serial No. 353,009

2 Claims. (Cl. 180—82)

My invention relates to latching mechanism and control therefor designed particularly for application to the alligator type of hood for automotive vehicles.

One object of my invention is to provide latch mechanism involving a rocking latch bolt which, after preliminary movement toward latching or unlatching position, is quickly moved or snapped by a cross-over spring to its full latching or unlatching position, and which when moved from its normal latching position to its unlatching position will effect a partial opening of the hood cover.

A further object of the invention is to provide a safety catch element inside of the hood which is accessible from outside of the hood for setting thereof to released position only after the hood has been partially opened.

A further important object of the invention is to provide a control means within the vehicle body operable only to effect, in conjunction with the cross center spring, movement of the latch bolt from its latching position to its unlatching position, the cover, when moved to closed position, serving to effect preliminary movement of the latch bolt toward latching position for complete movement of the bolt to latching position by the cross center spring which then functions to exert pressure on the latch bolt for holding the cover tightly closed against displacement or rattle.

Another object of the invention is to provide means whereby the safety catch may be released from within the vehicle body, such means being preferably a connection from the safety catch to some vehicle control member within the vehicle which is not apt to be accidentally manipulated while the vehicle is traveling. Such control member might be the emergency brake lever which is operated only under abnormal conditions or during critical situations while the vehicle is traveling. Therefore, while the vehicle is traveling, and the driver should accidentally operate the control for unlatching and partially raising of the hood cover, the hood cannot be swung up, as by wind pressure, on account of the safety catch which cannot be released except by operation of the brake lever, and as such brake lever is rarely manipulated during travel of the vehicle, there will be no danger of the hood swinging up during travel of the vehicle and thereby causing accidents.

With my improved arrangement, should the driver, while traveling on the road, desire to open the hood for access to the interior thereof, he will first operate the control for unlatching the hood and partial opening thereof, and he will then set the emergency brake to release the safety catch. Then when he steps out of the car the car is braked and he can safely raise the released hood for work at the inside thereof. Also, when driving into a service station, the driver can unlatch the hood and release the safety catch so that it will be unnecessary for him or the attendant to reach in under the partially opened hood for manual release of the safety catch.

The various features of my invention are embodied in the drawings, in which:

Figure 1 is a side elevation of the latching mechanism and the safety catch and their respective controls, the hood being in vertical section; and Figure 2 is a similar view showing the hood cover unlatched and partially raised and showing the operation of the brake lever for releasing the safety catch.

The hood body 10 has the wall or shelf 11 extending transversely at the front end thereof and is provided with a passageway or slot 12. Below this slot the supporting plate or base 13 for the latch mechanism is suspended and secured by flanges 14 which may be riveted or welded to the shelf 11.

The cover 15 has the inwardly extending seating flange 16 on which is supported a keeper plate 17 having the passageway 18 therethrough for registering with the passageway 12 in the shelf 11.

The latch structure supporting base 13 has the upward extension 19 supporting a fulcrum stud 20 on which is fulcrumed the rocking latch bolt 21 shown in the form of a plate. At its lower end the bolt carries a stud or pin 22 which passes through and moves along the arcuate slot 23 in the base 13.

When the cover is in its latched position, shown on Figure 1, the extension 19 and the outer part of the latch bolt will extend through the passageway 18 of the keeper plate 17 and the latching end or abutment 24 on the lever will abut against the inner side of the keeper plate to hold the cover in latched position. Below the latching abutment 24, the lever 21 has the raising arm 25 which, when the latch bolt is swung to its unlatching position (Figure 2) engages against the lower side of the keeper plate 17 to effect raising of the cover to a partially opened position.

On the side of the plate 13 opposite to the side on which the latch lever 21 is mounted is a link 26 mounted on the end of the pin 22 to swing thereon, a headed pin 27 extending through a guide slot 28 in the base 13 and being secured to the lower end of the link. Abutting this pin is the end of a spiral spring 29 anchored on the base 13, this spring at all times exerting longitudinal upward pressure against the link, so that when the latch bolt 21 rocks to move pin 22 along the slot 23, as soon as the pin passes through the spring pressure neutral line extending between the fulcrum 20 and the pin 27, the spring pressure on the link will cause the pin 22 to be quickly moved or snapped to the respective ends of the slot 23 for snap movement of the latch bolt to its latching or unlatching position. When the latch bolt is rocked to latching position, the stud 22 will be a distance short of the outer end of the slot 23 so that the spring pressure may continue against the latch bolt to insure full and tight closure of the cover and to take up any slack or lost motion. Rubber seating pads 30 may be supplied to the shelf 11 against which the cover will then be securely held by the spring pressure.

The stud 22 also supports a pawl 31 which has a detent projection or tooth 32 for engagement with detent teeth 33 on a bar 34 secured to the base plate 13, the teeth 33 being in a row concentric with the slot 23 in which the stud 22 moves. When the latch bolt 21 is in latching position, the pawl tooth 32 will engage one of the teeth 33 so that the latch bolt will be detained or locked in latching position, as shown on Figure 1. A compression spring 35 is interposed between the pawl and the arm 25 of the latch bolt, this spring tending to swing the bolt and pawl apart, and to swing the pawl against the stop 36 on the lever when the lever is swung to unlatching position.

The latch bolt 21 has the upwardly extending arm 37 terminating in a latch hook 38, and on the keeper plate 17, adjacent to the outer end of the passageway 18, is a keeper lip 39. When the latch bolt is in its latching position, the safety catch extension or arm 37 is swung rearwardly with its catch hook 38 out of the path of the keeper lip 39, but the latch bolt will then hold the cover closed. When the latch bolt is in its unlatching position and the cover has been partially raised, the safety catch arm 37 will be in its forward position with its catch hook 38 a short distance above and in the path of the keeper lip 39 so that full opening of the cover will be prevented until the safety catch is withdrawn.

Within the vehicle body, a control is installed for effecting operation of the latch bolt to unlatching position. As shown, a bracket 40 is secured on the instrument board 41, which bracket supports a sleeve 42 for a slide rod 43 terminating at its inner end in a knob or button 43'. The rod 43 is connected by a flexible cord or wire 44 with the lower end of the arm 45 depending from the pawl 31, this arm 45 being deflected to clear the toothed bar 34 and the pin 27 on the link 26. For rocking of the latch bolt to unlatched position the knob 43' is pulled out, this causing swing of the pawl 31 to carry its tooth 32 away from the detent teeth 33 to free the latch bolt, and then, through the spring 35, the latch bolt will be rocked toward its unlatching position, and as soon as the stud 22 passes the center line of pressure of the spring 29, the latch bolt will be quickly snapped into its unlatching position for unlatching of the cover and a partial opening thereof, as shown on Figure 2. The unlatching of the cover is thus controlled entirely from within the vehicle body. After unlatching of the cover by pull on the button 43', the safety catch hook 38 will be in its catching position above the keeper lip 39. If the driver is alone, and desires to open the hood to its full extent, he will step out of the vehicle and will raise the cover as far as the safety catch will permit, and will then insert his hand or a tool and will swing back the safety catch so that the cover can be fully opened. Such manual movement of the safety catch and the latch bolt will not be sufficient to bring the stud 22 back past the spring pressure center line, as the swing of the latch bolt is limited by engagement thereof with the edge of the keeper plate at the inner end of the passageway 18, so that after the cover has been fully raised, the latch bolt and safety catch will be restored to their full unlatching position. Then when the cover is swung to closed position the inclined keeper lip 39 will engage the inclined edge of the safety hook 38 to swing the safety hook out of the way, and then the keeper plate 17 will engage with the arm 25 of the latch bolt and the latch bolt will be started toward its latching position, and when the stud 22 passes through the spring pressure center line, the latch bolt will be quickly snapped into its latching position to completely close the cover and hold it tightly closed.

In order that release of the safety catch, after unlatching of the cover, may be accomplished by the driver from inside the vehicle, the safety catch arm 37 of the latch bolt is connected with some conventional vehicle control within the vehicle body which is not apt to be accidentally manipulated during travel of the car, so that if, while the car is running, and the knob 43' has been accidentally pulled out to unlatch the hood cover, there is little chance for accidental release of the safety catch so that the cover might be swung up by wind pressure and so be the cause of accident. I have shown the safety catch connected with the emergency brake lever 46, which is used only on rare occasions while the vehicle is traveling. The brake lever is fulcrumed at 47 and carries a pawl 48 cooperable with the teeth on a segment plate 49 for holding the lever in brake actuating position. A bracket 50 is pivoted by a pin 51 on the brake lever and a rod 52 extending therefrom is connected in any suitable manner with the emergency brake (not shown) so that when the brake lever is swung into braking position, indicated by dotted lines on Figure 2, the brake will be set.

A rod or wire 53 extends from the safety catch arm 37 and through the wall 50' of the bracket 50 for sliding movement relative to this wall, the rod terminating in an abutment nut or head 54. When the hood cover is latched closed, as shown on Figure 1, the abutment head 54 will be some distance displaced from the bracket wall 50' so that the emergency brake may be used in its ordinary capacity without interfering with the hood latch mechanism. Should the driver desire to have access to the interior of the hood, he will stop the car and first pull out the button 43' for setting of the latch bolt to unlatching position and partial raising of the cover and swing of the catch arm 37 to catch position above the keeper lip 39, as shown on Figure 2. He will then swing the emergency brake lever to its brake setting position and just before the brake lever reaches its brake setting position the bracket wall 50' will engage with the abutment head 54 on the rod 53, so that during the final movement of the brake lever to brake setting position the latch hook will be rocked back sufficiently for withdrawing the catch hook 38 from the path of the keeper lip 39. The car being now braked against travel, the driver may step out of the car and raise the hood to its full open position. Then, when the cover is swung back toward its closed position, the keeper plate 17 will engage the latch bolt arm 25 for rocking of the latch bolt and the safety catch arm back to latching position, the rod 53 during this movement sliding on the bracket 50 back to its normal position. Also during such closure movement of the cover, the button 43' will be drawn back to its normal position. The driver can then enter the car, and the brake lever may then be released. By means of this control from inside of the vehicle, it will be unnecessary for the driver or a service station attendant to insert his hand through the partial opening of the cover for manual release of the safety catch from the keeper lip 39. Release of the cover for full opening by setting of the emergency brake also has the advantage that the vehicle will be braked against any travel while work is being performed inside of the hood.

I have shown a practical and efficient embodiment of my invention but I do not desire to be limited to the exact structural arrangement and operation shown and described, as changes and modifications may be made without departing from the scope of the invention.

I claim as my invention:

1. Latching means for the cover of an alligator type hood of an automotive vehicle comprising main latching means normally holding said cover closed and operable to unlatch said cover and effect partial opening thereof, control means within the vehicle body for effecting unlatching of said main latching means, a safety catch disposed to limit further opening movement of said cover after partial opening thereof by said main latching means, and a connection between said safety catch and the emergency brake lever within the vehicle body effective upon setting of said emergency brake to move said safety catch to permit full opening of said cover.

2. Latch mechanism for an alligator hood structure of an automotive vehicle comprising keeper means on the hood cover, a rockable latch bolt on the hood body, said latch bolt being normally in position to engage the keeper means to latch the cover closed, said latch bolt being rockable in unlatching direction to unlatch the cover for partial opening but to latch the cover against full opening, means controllable from within the vehicle body for effecting such unlatching and partial opening of the cover, and a connection between said latch bolt and the emergency brake lever within the vehicle body effective upon setting of the brake lever to braking position to move said latch bolt sufficiently to permit full opening movement of said cover from its partially opened position.

EDWARD D. DALL.